Feb. 16, 1937.   J. AGGER   2,070,637
OIL SEAL
Filed Nov. 20, 1935
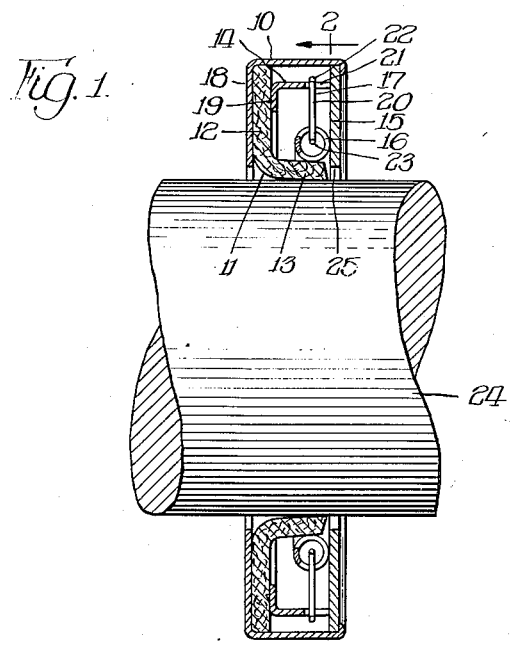
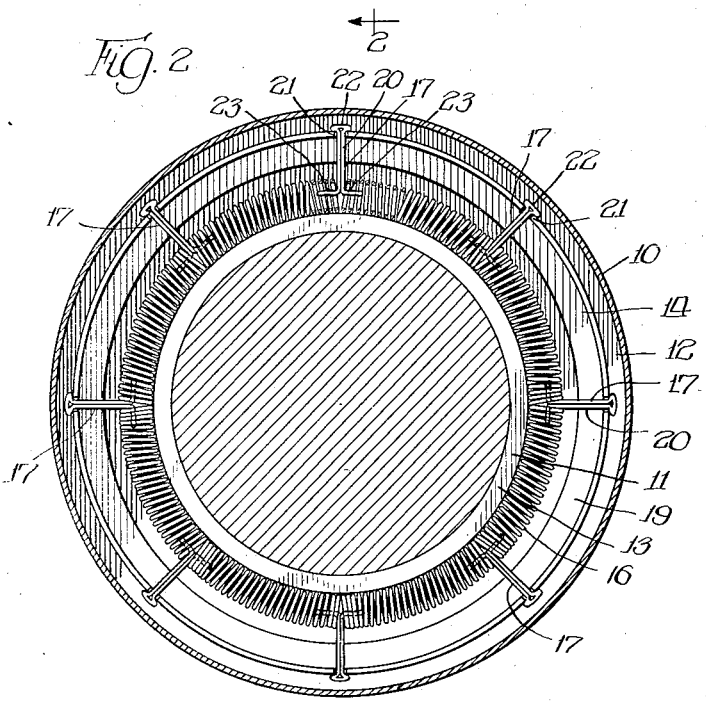
Inventor:
Jens Agger, Patented Feb. 16, 1937

2,070,637

UNITED STATES PATENT OFFICE 2,070,637

OIL SEAL

Jens Agger, Chicago, Ill., assignor to Chicago Rawhide Manufacturing Company, Chicago, Ill., a corporation of Illinois Application November 20, 1935, Serial No. 50,687

6 Claims. (Cl. 288—1)

In self-contained oil seals of the type using a coil spring about the sealing portion of the packing, difficulty is frequently experienced, particularly in the larger sizes of seals, in getting the spring to stay in place when the shaft or other rotatable member is temporarily withdrawn for any reason from within the oil-softened sealing portion of the packing.

The object of the present invention is to provide, in a seal of the character described, means for preventing the spring from getting out of place, without interfering in any way with the normal constricting action of the spring.

While the foregoing statements are indicative in a general way of the nature of the invention, other more specific objects and advantages will be apparent to those skilled in the art upon a full understanding of the spring control means.

One form of the invention is presented herein for the purpose of exemplification, but it will of course be understood that the invention is capable of being embodied in various other structurally modified and different forms coming equally within the scope of the appended claims.

In the accompanying drawing:

Fig. 1 is a sectional view of a seal which is constructed in accordance with the invention; and Fig. 2 is another sectional view of the same seal, taken on the line 2—2 of Fig. 1.

The seal which is shown in the drawing includes a cup-shaped sheet metal casing 10, a leather packing 11 which has a radially extending flange 12 and an axially extending flange 13, a cup-shaped sheet metal inner shell 14, a washer 15, a coil spring 16, and a plurality of small wire spring-controlling hangers 17. The packing is positioned in the casing 10 with its radially extending portion 12 clamped tightly between the bottom 18 of the casing and the bottom 19 of the inner shell and with its axially extending portion 13 constricted resiliently by the coil spring 16. The inner shell 14 is held in position against the radially extending portion 12 of the packing by the washer 15, which washer also engages loosely with the adjacent face of the spring 16 and keeps the latter from working off of the edge of the axially extending portion of the packing.

The hangers 17 are T-shaped and are provided with stems 20 which are disposed in slots 21 in the rim of the inner shell and extend radially inward into positions between the coils of the spring 16. The outer ends of the stems 20 have enlarged heads 22 which hook with the rim of the inner shell and limit the inward movement of the stems, while the inner ends of the stems have oppositely projecting wire sections 23 which extend circumferentially of the spring within the hollow interior of the latter and form in effect an interrupted ring of fixed minimum diameter.

Before the seal is placed in service the circumferentially extending wire sections 23 of the hangers within the spring will ordinarily be disposed adjacent the outer portions of the coils, but when the seal is caused to receive a shaft 24 or other rotatable member the sealing portion 13 of the packing will be distended to take the shaft and the wire sections 23 will occupy positions more nearly in the center of the hollow interior of the spring.

Should the shaft 24 be temporarily withdrawn for any reason after the seal has been in service, the contracting action of the spring, which might otherwise press in the oil-softened portion 13 of the packing at one or more places and allow the spring to snap out of the casing through the hole 25 in the washer, is prevented from constricting the portion 13 too far by the limiting effect of the circumferentially extending wire sections 23. As these wire sections define an interrupted ring-like frame which is of a fixed minimum diameter, they will limit the extent to which the spring can contract, and as soon as the contraction of the spring is stopped the sealing portion 13 of the packing will be relieved of the spring's pressure and will maintain its proper shape without flattening out, buckling or otherwise becoming deformed, until such time as the shaft is again back in position.

The greater the circumferential extent of the wire sections 23, the more continuous the support for the spring will be, but in the form of the invention herein presented, wherein the wire sections are connected with the inner shell at intervals, it is difficult to make the sections very long and still insert them easily between the coils of the spring. A more nearly continuous ring can be obtained, however, by simply increasing the number of the hangers. The hook-like connections between the wire sections 23 and the surrounding inner shell also serve to keep the spring approximately centered within the casing when the spring is in a contracted condition. This is an advantageous feature, as in very large seals of the type used, for instance, on the necks of the rolls in steel mills, the spring sometimes tends to settle or drop down into an eccentric position wherein its upper edge can work out through the hole in the end of the seal.

Although the invention has been illustrated and described in connection with a self-contained sealing unit, it will of course be appreciated that certain features of the invention are applicable to a seal of the type which is adapted to have its parts assembled at the time of installation for service.

I claim:

1. In a self-contained seal, a casing, a packing mounted in the casing and provided with an axially extending flange for sealing engagement with a rotatable member, an endless coil spring for constricting the flange, supporting means for the spring so constructed and arranged as to limit the extent to which the spring may contract in constricting the flange, and means for limiting the extent to which the spring may move out of its normal centered position in the casing when it contracts.

2. In a seal, a packing provided with an axially extending flange for sealing engagement with a rotatable member, an endless coil spring for constricting the flange, and means engageable with the spring within the hollow interior of the latter for preventing the spring from contracting beyond a predetermined minimum diameter.

3. In a seal, a packing provided with an axially extending flange for sealing engagement with a rotatable member, an endless coil spring for constricting the flange, and means engageable with the spring within the hollow interior of the latter for keeping the spring approximately circular.

4. In a self-contained seal, a casing, a packing in the casing provided with an axially extending flange for sealing engagement with a rotatable member, an inner shell in the casing for clamping the packing to the casing, an endless coil spring for constricting the flange of the packing, and means engageable with the spring within the hollow interior of the latter for preventing the spring from contracting beyond a predetermined minimum diameter.

5. In a self-contained seal, a casing, a packing in the casing provided with an axially extending flange for sealing engagement with a rotatable member, an inner shell in the casing for clamping the packing to the casing, an endless coil spring for constricting the flange of the packing, and means engageable with the spring within the hollow interior of the latter for preventing the spring from contracting beyond a predetermined minimum diameter, said means cooperating with the inner shell to keep the spring approximately centered in the casing when contracted.

6. In a seal, a packing provided with a constrictable portion for sealing engagement with a rotatable member, a spring for constricting the sealing portion of the packing, and supporting means for the spring so constructed and arranged as to limit the extent to which the spring may contract in constricting the sealing portion, said sealing portion being constrictable beyond the point where the spring is allowed to constrict it.

JENS AGGER.